United States Patent
Kang et al.

(10) Patent No.: US 12,112,340 B2
(45) Date of Patent: Oct. 8, 2024

(54) IDENTIFICATION OF FRAUDULENT ONLINE PROFILES

(71) Applicant: PayPal, Inc., San Jose, CA (US)

(72) Inventors: Abraham Joseph Kang, Los Gatos, CA (US); Vinh Nguyen, Mesa, AZ (US); Bharat Chandra Penta, Bayonne, NJ (US); Kevin Charles Griffin, Petaluma, CA (US); Faisal M. Khan, Berkeley, CA (US)

(73) Assignee: PayPal, Inc., San Jose, CA (US)

( * ) Notice: Subject to any disclaimer, the term of this patent is extended or adjusted under 35 U.S.C. 154(b) by 88 days.

(21) Appl. No.: 17/371,083

(22) Filed: Jul. 8, 2021

(65) Prior Publication Data
US 2023/0009317 A1    Jan. 12, 2023

(51) Int. Cl.
*G06Q 30/018*    (2023.01)
*G06N 3/08*    (2023.01)

(52) U.S. Cl.
CPC .............. *G06Q 30/018* (2013.01); *G06N 3/08* (2013.01)

(58) Field of Classification Search
CPC ........ G06Q 30/018; G06N 3/08; G06N 3/045; G06N 3/0464
See application file for complete search history.

(56) References Cited

U.S. PATENT DOCUMENTS

| | | | |
|---|---|---|---|
| 8,041,597 B2 | 10/2011 | Li et al. | |
| 9,027,134 B2 * | 5/2015 | Foster | G06F 21/60 726/22 |
| 9,674,214 B2 * | 6/2017 | Foster | H04L 63/1441 |
| 10,637,959 B2 * | 4/2020 | Levi | G06F 21/577 |
| 10,803,301 B1 * | 10/2020 | Farivar | G06N 3/045 |
| 11,157,575 B2 * | 10/2021 | Tripodi | G06Q 50/01 |
| 11,182,468 B1 * | 11/2021 | Walters | G06F 21/36 |

(Continued)

FOREIGN PATENT DOCUMENTS

WO    WO2020210826 A1 * 10/2020 ............. G06F 19/00

OTHER PUBLICATIONS

"A friendly introduction to Siamese Networks" Towards Data Science (Sean Benhur, Sep. 2020).*

(Continued)

*Primary Examiner* — Paul R Fisher
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to methods that include training, by a new profile process executing on a computer system, a contrastive loss function to identify fraudulent images associated with a particular entity. The new profile process may receive new profile information that includes a new profile image and a new profile identifier and compare the new profile identifier to one or more existing profile identifiers. In response to determining that one or more existing profile identifiers satisfy a threshold identifier metric, a particular neural network, using the contrastive loss function, may compare the new profile image to one or more existing profile images corresponding to the one or more existing profile identifiers. The new profile process may determine, using the comparing, whether the new profile information is a possible fake profile of a legitimate profile.

20 Claims, 9 Drawing Sheets

(56) References Cited

U.S. PATENT DOCUMENTS

| | | | | |
|---|---|---|---|---|
| 2014/0115657 | A1* | 4/2014 | Ayodele | G06F 21/64 |
| | | | | 726/1 |
| 2016/0005029 | A1 | 1/2016 | Ivey et al. | |
| 2016/0005050 | A1* | 1/2016 | Teman | G06Q 30/018 |
| | | | | 705/317 |
| 2017/0228745 | A1* | 8/2017 | Garcia | G06Q 30/0203 |
| 2019/0147043 | A1* | 5/2019 | Moskowitz | A61B 5/165 |
| | | | | 704/9 |
| 2019/0220545 | A1* | 7/2019 | Tripodi | G06Q 50/01 |
| 2019/0318219 | A1* | 10/2019 | Arora | G06N 5/04 |
| 2019/0332849 | A1* | 10/2019 | Gupta | G06N 3/045 |
| 2020/0160356 | A1* | 5/2020 | McCord | G10L 15/22 |
| 2020/0358796 | A1* | 11/2020 | Kundu | G06N 3/045 |
| 2020/0401617 | A1* | 12/2020 | Spiegel | G06F 16/587 |
| 2022/0046012 | A1* | 2/2022 | Neagle | G06F 18/22 |

OTHER PUBLICATIONS

"A friendly introduction to Siamese Networks" Sean Benhur, Sep. 2020.*

Y. Zhan, K. Fu, M. Yan, X. Sun, H. Wang and X. Qiu, "Change Detection Based on Deep Siamese Convolutional Network for Optical Aerial Images," in IEEE Geoscience and Remote Sensing Letters, vol. 14, No. 10, pp. 1845-1849, Oct. 2017 (Year: 2017).*

* cited by examiner

Training Example 200

Training Example 250

IDENTIFICATION OF FRAUDULENT ONLINE PROFILES

BACKGROUND

Technical Field

This disclosure relates generally to computer system operations, and more particularly to identification of fraudulent online profiles.

Description of the Related Art

Various forms of social media are used not only by individuals, but also by businesses (small and large), government organizations, schools from pre-kindergartens to universities, community organizations, and the like, to disseminate information online, provide a convenient feedback loop, execute transactions, and other uses. Online security has become a more serious concern for social media platforms that desire safe, accurate, and clear communication between the account owners and those users. Malicious entities across the world may attempt to scam users or disrupt services provided by account owners for financial gain, personal attacks, and other illegal and/or unethical reasons.

One method for deceiving users involves attempting to get a user to visit a fake account that is posing as a legitimate account in order to trick the user. These fake accounts may include names and images that are deceptively close to the actual account being mimicked. The fake accounts may differ from the legitimate accounts by a single character in an account name and/or by using images that include similar logos or other forms of branding that include many features of the legitimate branding. These deceptive practices may fool users into believing the fake accounts are actually the legitimate accounts, resulting in the user receiving inaccurate information, providing sensitive information to the malicious entity, executing a deceptive transaction, and the like.

DETAILED DESCRIPTION

As described above, fake profiles may be utilized by malicious entities with illegitimate intentions, such as deceptively obtaining sensitive information, distributing false information, performing fraudulent transactions, and the like. A web-based service that provides legitimate online profiles for users may wish to detect and remove such fake profiles to increase user trust in the web-based service and provide the users with safe, accurate means for interacting with the user's audience. One method for reducing a number of fake profiles is to analyze requests for new profiles and determine if the new profile includes information that is deceptively close to an existing profile. Many social media profiles, however, include images as well as textual information. Managing profiles for a web-based service with millions, or even billions of users, however, may require a vast number of human resources to analyze all accounts and determine if a new request is too similar to an existing profile. In addition, current methods for automating such determinations may prove to be too inaccurate, particularly for image analysis, thereby still requiring the human resources to review decisions made by the automated analysis.

The present disclosure recognizes a desire for a technique that provides an automated technique for analyzing new profile requests and is capable of delivering accurate results with little to no human interaction. One embodiment of such a technique includes, training, by a new profile process executing on a computer system, a contrastive loss function (such as a triplet loss function) to identify fraudulent images associated with a particular entity. In response to receiving new profile information that includes a new profile image and a new profile identifier, this new profile process compares the new profile identifier to one or more existing profile identifiers. If one or more existing profile identifiers satisfy a threshold identifier metric, the new profile process, using the trained contrastive loss function, compares the new profile image to one or more existing profile images corresponding to the one or more existing profile identifiers. The new profile process uses the comparing to determine whether the new profile information is a possible fake profile of a legitimate profile. Using a trained contrastive loss function in this manner, the accuracy of image analysis may be increased, thereby allowing for an increased usage of automated profile analysis.

Use of such an automated method may increase a level of protection of user profiles against impostors by, for example, comparing all new profile requests to all existing user profiles. By accurately identifying potential imposter profiles, the imposters may be denied new profiles while legitimate new profile requests are fulfilled. In some embodiments, a potential imposter profile may be flagged for further analysis to reduce a number of false positive determinations.

Figure 1:
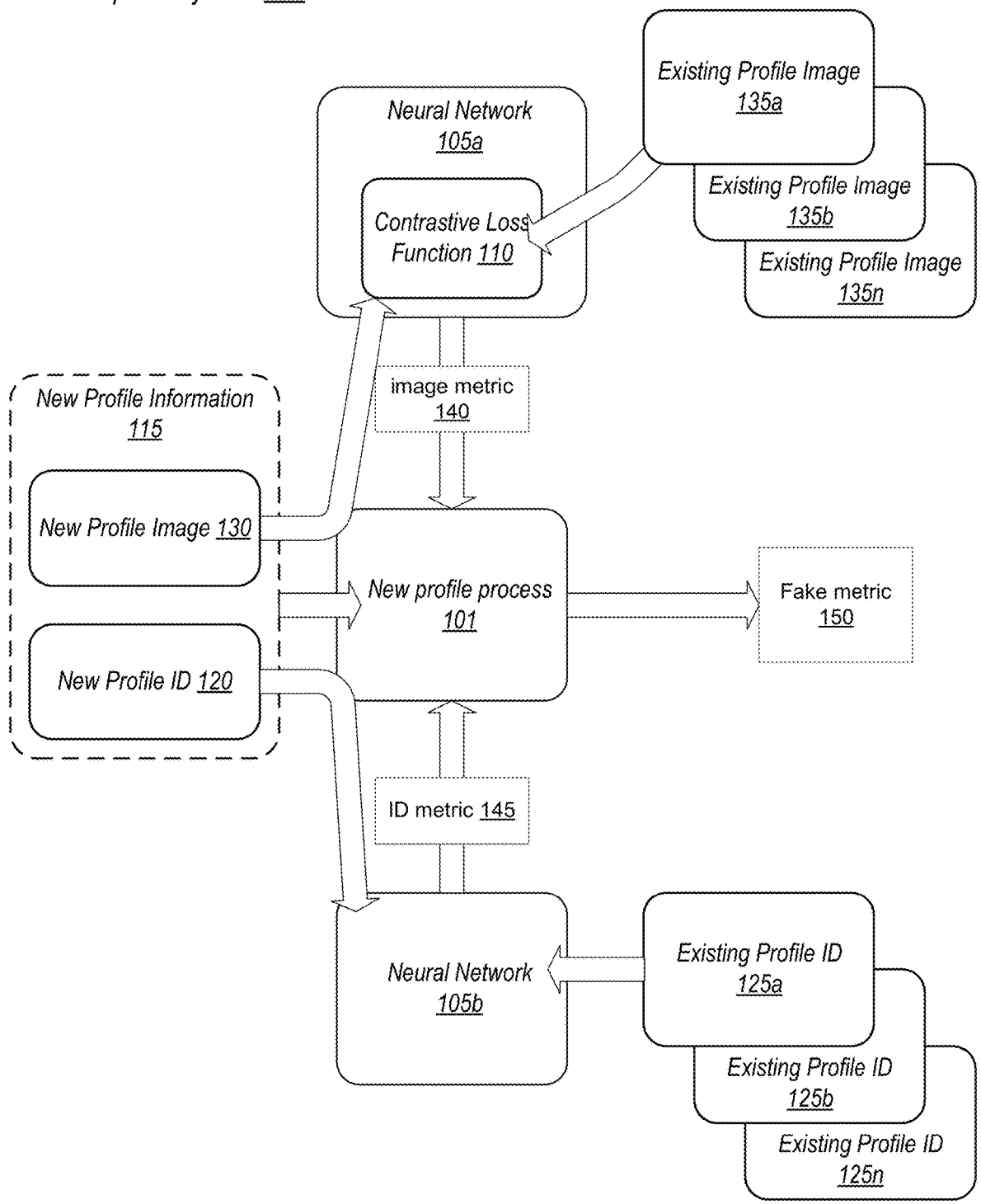
FIG. 1 is a block diagram illustrating an embodiment of a computer system on which a new profile process is executing.

A block diagram of an embodiment of a computer system that receives and analyzes new profile requests is illustrated in FIG. 1. Computer system 100 includes new profile process 101 that receives new profile information 115 (including new profile identifier (ID) 120 and new profile image 130) as part of a new profile request received from a client device (not shown). New profile process 101 uses neural networks 105a and 105b to compare new profile information 115 to profile information from existing profiles, including existing profile identifiers (IDs) 125a-125n (collectively existing profile identifiers 125) and existing profile images 135a-135n (collectively existing profile images 135). Neural networks 105a and 105b generate image metric 140 and identifier metric 145, respectively, which new profile process 101 uses to generate fake metric 150 that provides an indication of whether new profile information 115 is part of a fraudulent profile request.

Computer system 100, as illustrated, is part of an online service that allows users to create respective user profiles that may be used by the corresponding user to interact with other users, including sharing information, performing transactions between users, and/or receiving feedback from the other users. Users of the online service may include individuals, small or large businesses, educational institutions, community organizations, government entities, and the like. In various embodiments, computer system 100 may be a single computer system or a plurality of computer systems included, for example, in a server farm. In some embodiments, computer system 100 may be a subset of bandwidth of a server farm leased from a third party. New profile process 101, as well as neural networks 105a and 105b may be implemented as computer instructions stored on a non-transitory, computer-readable medium that are included in, or accessible by, computer system 100. New profile process 101 and neural networks 105a and 105b may include instructions that are executable by a computer system to perform some or all of the operations described herein. In some embodiments, some of the operations may be implemented as hardware, such as custom logic circuits, programmable logic arrays, or application-specific integrated circuits.

As shown, when a user wants to create a profile, the user sends a new profile request to computer system 100, the request including new profile information 115. New profile information includes new profile identifier 120 and new profile image 130. Profiles created with the online service include a profile identifier, selected by the user, that uniquely identifies a given profile from other profiles created in the online service. The given profile and content presented on the online service via the given profile is identified to other users by the profile identifier. A given user may use any suitable string of characters as the profile identifier, including, for example, their name or a portion thereof, a nickname, an online persona, a business/organization name, and the like.

Two different users, however, may have similar profile information, such as two individuals, one named "John Q. Smith" and the other named "John Z. Smith" or two small businesses with similar names such as "Acme Brick Company" and "Acme Building Supplies, Co." In such cases, both users may request user profiles with a same profile identifier, e.g., "John Smith" or "Acme, Co." New profile process 101, however, may not allow the second requestor to have a profile identifier that is the same as an existing profile identifier. Accordingly, John Q. may be first to request the "John Smith" profile identifier and John Z. may therefore have to modify his request, e.g., to "John Z. Smith." In these cases, profile images may be included in the profile information, and if the two users are legitimately unique, then the images may be expected to provide distinction between the two users. If, however, the second user is attempting to create a fraudulent user profile, then the second user may attempt to use images that are similar to the first user's images. For example, if "Acme Building Supplies, Co." is an attempt to purposely confuse Acme Brick Company's customers into going to the "Acme Building Supplies, Co." profile instead, then the second user may obtain images that similar to images found on the "Acme Brick Company" profile. Acme Brick Company may include a business logo in one or more of their images, and/or use an image of their storefront. The second user may create, find, or modify images to appear similar to the images of the "Acme Brick Company" profile.

To reduce a likelihood of fraudulent profiles being created, computer system 100, as illustrated, performs new profile process 101 to receive new profile information 115, determine if new profile information 115 is part of a legitimate new profile requests or if new profile information 115 appears to be part of a fraudulent profile request. Prior to receiving new profile requests, computer system 100 trains contrastive loss function 110 to identify fraudulent images associated with a particular entity. Contrastive loss function 110 may, in some embodiments, be a triplet loss function. Such training includes identifying images from a first entity that are similar to one or more images associated with a second entity, and identifying images from the first entity that are different from one or more other images that are also associated with the first entity. For example, images associated with a particular business are compared with very similar images associated with a different company, not associated with the particular business. These images may have various details, such as logos that include similar color schemes and/or shapes, and new profile process is trained to identify differences between the images from the different businesses. In addition, a variety of images that are associated with the particular business, but have very different shapes and/or colors are provided to new profile process 101, which is then trained to identify similarities between the different images.

As illustrated, after new profile process 101 has been trained, new profile information 115, including new profile image 130 and new profile identifier 120, is received. New profile information 115 may be included in a request to create a new profile. In other embodiments, new profile information 115 may be received in response to a request from new profile process 101 after new profile process 101 has received the new profile request. Before approving the new profile request, new profile process 101 determines if there is an existing profile with profile information that matches new profile information 115.

New profile process 101 compares new profile identifier 120 to one or more existing profile identifiers 125 stored by computer system 100. As illustrated, neural network 105b is used to perform the comparison of new profile identifier 120 to existing profile identifiers 125. For example, alphanumeric characters in new profile identifier 120 may be compared to characters in existing profile identifiers 125. If there is an exact match, then the new profile request may be rejected and/or a notification sent to the requestor indicating that new profile identifier 120 is already in use and that a different identifier must be used. Otherwise, one or more of existing profile identifiers 125 that are close matches to new profile identifier 120 are identified, and corresponding identifier metrics 145 are determined for each of the identified existing profile identifiers 125.

As shown, in response to determining that at least one of existing profile identifiers 125 satisfies a threshold identifier metric relative to new profile identifier 120, computer system 100 compares new profile image 130 to one or more existing profile images 135 corresponding to the at least one of existing profile identifiers 125. Computer system 100 may perform this comparing using neural network 105a that implements contrastive loss function 110. The threshold identifier metric may provide an indication whether new profile identifier 120 satisfies a threshold level of similarity to a particular existing profile identifier 125 associated with a particular account. If a particular existing profile identifier 125 (e.g., 125b) is identified, then existing profile image 135*b*, corresponding to the same profile as existing profile identifier 125*b*, is compared to new profile image 130. If multiple existing profile identifiers 125 satisfy the threshold identifier metric, then neural network 105*a* may be run for each corresponding existing profile image 135.

Neural network 105*a* uses contrastive loss function 110 to identify whether new profile image 130 is too similar to the one or more identified existing profile images 135. As described above, contrastive loss function 110 is trained to identify differences between similar images associated with different entities, and to identify similarities between differing images associated with a same entity. Accordingly, contrastive loss function 110 may enable neural network 105*a* to recognize potentially deceitful images that look like they are associated with an unassociated entity, and deceitful images in which a legitimate image associated with an entity have been modified to be distinct from the legitimate image but still potentially recognizable as associated with the entity. Additional details regarding the contrastive loss function are provided below in reference to FIG. 2.

New profile process 101, as illustrated, determines whether new profile information 115 is a possible fake profile of a legitimate profile. For example, in response to determining that new profile image 130 satisfies a threshold level of similarity to a particular existing profile image 135 (e.g., 135*b*) associated with a particular account, new profile process 101 identifies new profile information 115 as a possible fake profile of the particular account. In response to identifying new profile information 115 as a possible fake profile of the particular account, new profile process may select one of a set of actions based at least on a degree of similarity between new profile identifier 120 and existing profile identifier 125*b*, as well as a degree of similarity between new profile image 130 and particular existing profile image 135*b*.

In response to determining that the degree of similarity to both existing profile identifier 125*b* and existing profile image 135*b* satisfies a different threshold, computer system 100 may reject the new account profile request. For example, fake metric 150 may be compared to a first threshold level to identify whether new profile information 115 is related to a possible fraudulent profile. Fake metric 150 may be compared to a second threshold level to determine if there is a strong indication that new profile information 115 is related to a fraudulent profile. If fake metric 150 produces a strong indication of fraud, then the request for the new account may be rejected. An indication that the request has been rejected may be sent to the requesting device. A reason for the rejection may or may not be provided in various embodiments.

Otherwise, if the degree of similarity to both existing profile identifier 125*b* and existing profile image 135*b* fails to satisfy the different threshold, then the new profile request may be approved. An indication, however, may be included that new profile information 115 has similarities to the particular profile associated with existing profile identifier 125*b*. For example, a log may be kept for new profile activations and a flag may be set in an entry for new profile identifier 120 indicating the satisfying of the first threshold level. A system administrator may review the log and perform an additional comparison of the new profile and any existing profiles that are indicated as potential matches.

It is noted that the embodiment of FIG. 1 is merely an example. Elements of the computer system and processes have been simplified for clarity. In some embodiments, the operations described may occur in a different order. For example, the comparison of profile images is disclosed as occurring in response to a potential match between the new profile identifier and one or more existing profile identifiers. In other embodiments, the new profile image may be compared to existing profile images and a comparison of profile identifiers is performed in response to a potential image match.

The system of FIG. 1 includes a description of a computer system that uses a contrastive loss function to compare images. As described, this contrastive loss function is trained identify similarities between two very different images associated with a same entity and to identify differences between two very similar images associated with different images. A particular example of training a contrastive loss function is shown in FIG. 2.

Figure 2:
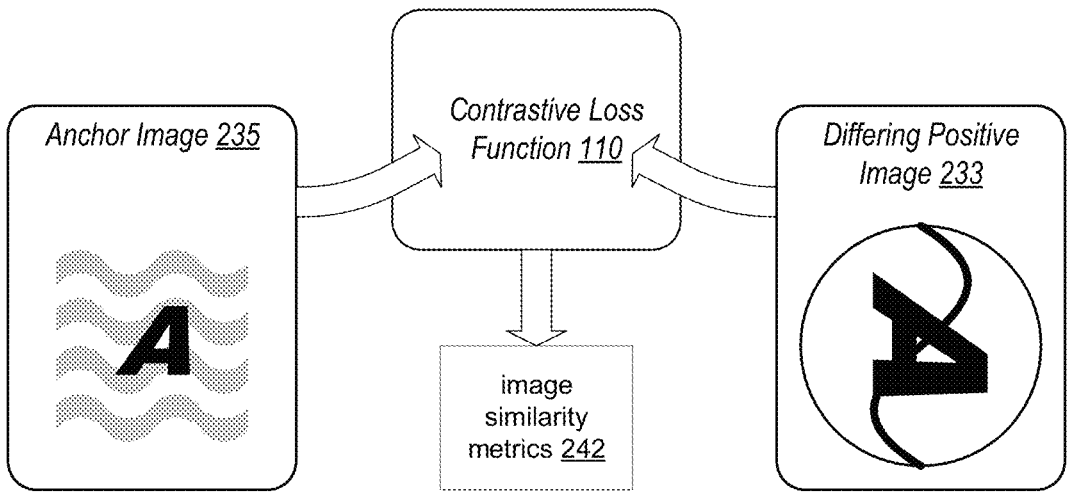
FIG. 2 depicts two embodiments of training of a contrastive loss function.
Figure 2:
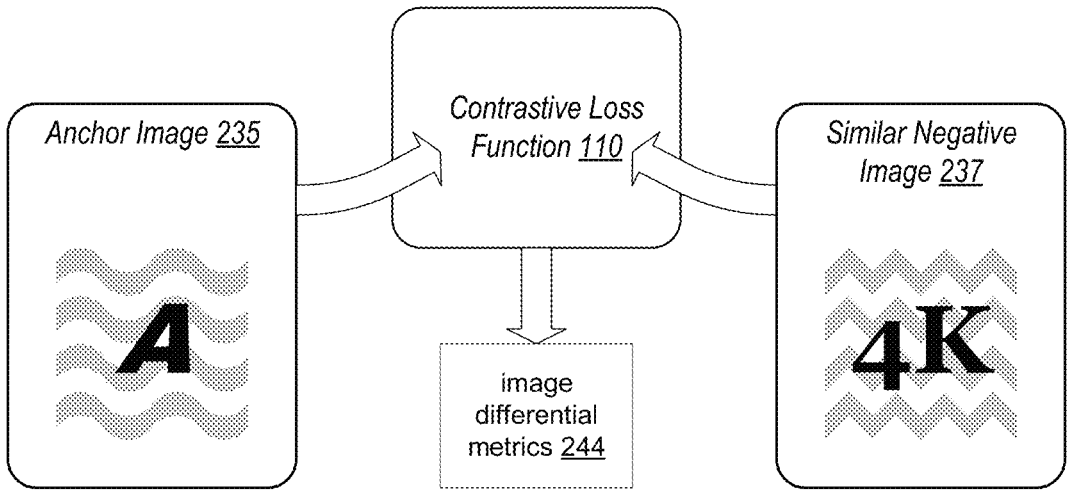

Moving to FIG. 2, two examples associated with training a contrastive loss function are depicted. As illustrated, training example 200 depicts a training comparison between anchor image 235, associated with a particular anchor entity, and differing positive image 233 that is also associated with the anchor entity, the comparison producing image similarity metrics 242. Training example 250 depicts a training comparison between anchor image 235 and similar negative image 237 that is associated with a different entity, and not the anchor entity, the comparison producing image differential metrics 244. A goal is to train contrastive loss function 110 to identify images that are a positive match (e.g., are associated with the anchor entity), but look different from the anchor image. Another goal is to train contrastive loss function 110 to identify images that are a negative match (e.g., are not associated with the anchor entity) but that look similar to the anchor image.

As illustrated, computer system 100 performs the training, for example, using new profile process 101 or a different training process executing on computer system 100. As stated, training example 200 includes training contrastive loss function 110 to identify similarities between two differing images associated with a common entity. Contrastive loss function 110 is trained to identify similarities between anchor image 235 corresponding to an anchor entity and differing positive image 233 that is also associated with the anchor entity. In this particular example, the images include a business logo with a capital "A" on top of one or more sine waves. The machine learning model is forced to find the relevant similarities in the two images, even though the two images have multiple differences, such as anchor image 235 having multiple sine waves in a gray color and differing positive image 233 having a single sine wave in a black color, and being thinner than the sine waves of anchor image 235. In addition, differing positive image 233 includes a circular border and has been rotated ninety degrees in comparison to anchor image 235.

To perform the comparison, contrastive loss function 110 determines a distance of differing positive image 233 from anchor image 235. As used herein in regards to the contrastive loss function, "distance" refers to a numerical difference between two points in Euclidian space. To compare images, each image is processed to generate one or more vectors in the Euclidean space. This processing is accomplished by using pixel data from a plurality pixels in a given image. Each pixel includes a plurality of bits that form one or more values representing the color and luminance of the respective pixel. Any number of functions may be utilized to generate respective vectors that correspond to one or more characteristics of the image. Contrastive loss function 110 may take a particular vector from anchor image 235 and determine a distance value from a corresponding vector from differing positive image 233. This may be repeated for a plurality of vectors from both images, creating a set of image similarity metrics 242.

Computer system 100, as shown, may further train contrastive loss function 110 to identify differences between two similar images associated with different entities. As disclosed, training example 250 includes training contrastive loss function 110 to identify differences between anchor image 235 and similar negative image 237 that is associated with a different entity from the anchor entity. Contrastive loss function 110 is forced to look for relevant differences between similar images that belong to different entities. In training example 250, the two images include respective business logos. Anchor image 235 includes the capital "A" on top of four sine waves, while similar negative image 237 includes the characters "4K" on top of four triangle waves. In this example, the machine learning model is forced to find the relevant differences in the two similar images. For example, contrastive loss function 110 may detect the differences between the sine wave pattern and the triangle wave pattern, as well as the different characters and number of characters. As in training example, 200, vector representations of the two images are generated and distances are calculated to generate a set of image differential metrics 244.

The training, as illustrated, includes using image similarity metrics 242 and image differential metrics 244 to calculate a loss value using equation 1.

$$\text{Loss} = \sum_{i=1}^{N}\left[\|f_i^{\alpha} - f_i^{p}\|_2^2 - \|f_i^{\alpha} - f_i^{n}\|_2^2 + \alpha\right] \quad (1)$$

Equation 1 determines squares of the differences between vectors of anchor image 235 ($f_i^{\alpha}$) and vectors of differing positive image 233 ($f_i^{p}$), and then subtracts squares of the differences between vectors of anchor image 235 ($f_i^{\alpha}$) and vectors of similar negative image 237 ($f_i^{n}$). The functions used to determine the vector values may remove rotational and other differences between two images being compared. For example, in addition to rotational differences, color and or luminescence differences may be removed to focus the comparison on the general shapes.

The training of contrastive loss function 110 may be repeated for a set of differing positive images and/or similar negative images. Additionally, the training may be repeated for a plurality of anchor images. For each additional anchor image, a respective set of differing positive images and similar negative images may be included. Generally speaking, the more images that are used, the more accurate contrastive loss function 110 may perform.

It is noted that the example of FIG. 2 is for demonstrating the disclosed concepts. Only details related to these concepts have been illustrated. Although business logos are used in the illustrated examples, any suitable images capable of representing an entity may be utilized. Although one each of a differing positive image and a similar negative image are shown for use with the illustrated anchor image, any suitable number of positive and negative images may be used.

Figure 3:
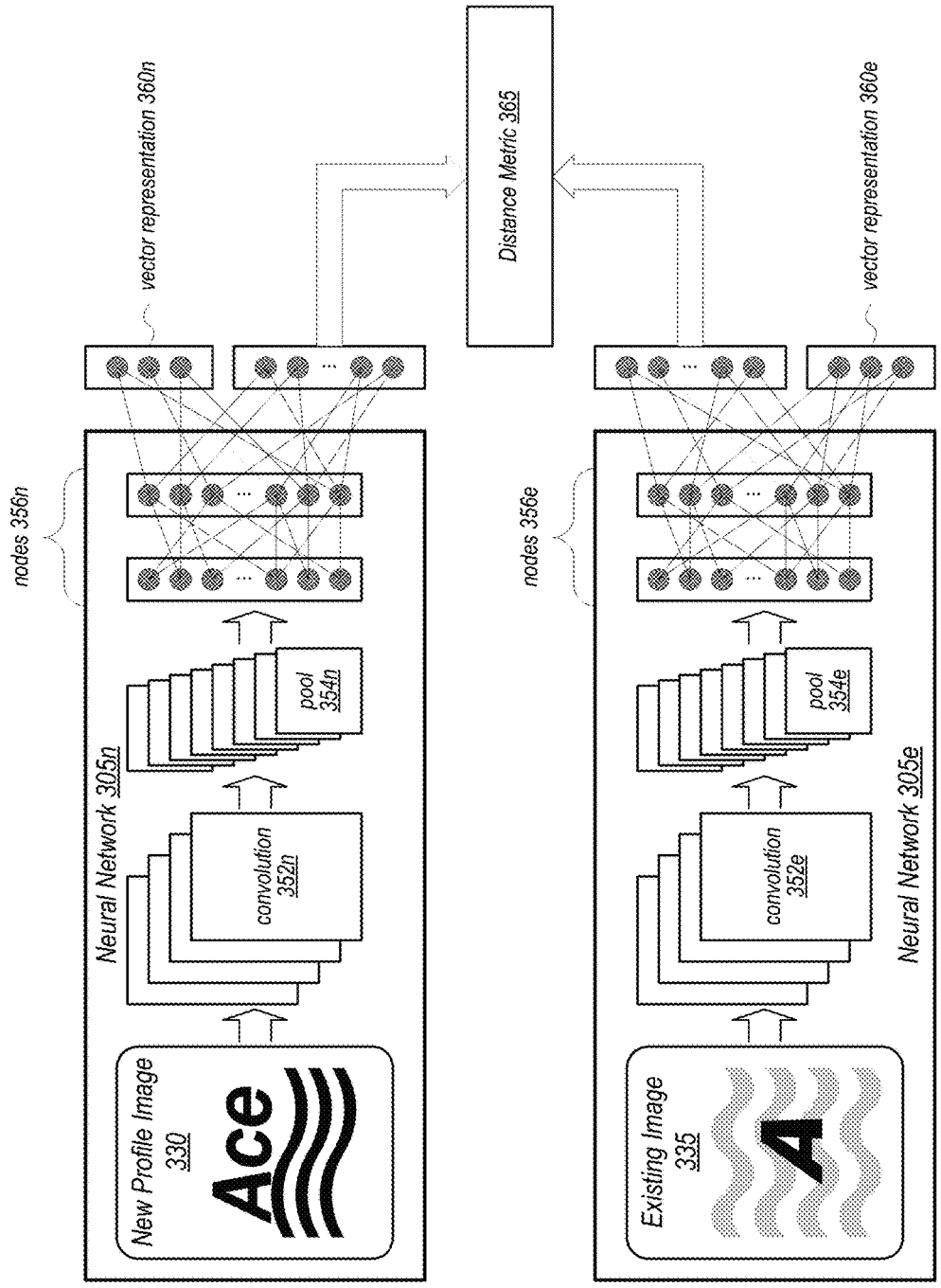
FIG. 3 shows a block diagram of an embodiment of a neural network performing a comparison between two images.

FIG. 2 illustrates an example of training a contrastive loss function. Once the contrastive loss function has been adequately trained, it may be utilized in various ways by a machine learning model to compare a new profile image to an existing image. In FIG. 3, an example of comparing a new profile image to an existing image is depicted.

Turning to FIG. 3, an embodiment of a machine learning model for comparing a new profile image to an existing image is illustrated. Machine learning model 300 is implemented on computer system 100 and includes neural networks 305n and 305e which are used to generate vector representations 360n and 360e of new profile image 330 and existing image 335, respectively. In the example of FIG. 3, machine learning model 300 uses vector representations 360n and 360e to compare new profile image 330 to existing image 335.

As illustrated, machine learning model 300 uses neural network 305n to generate vector representation 360n of new profile image 330, and uses neural network 305e to generate vector representation 360e of existing image 335. Neural networks 305n and/or 305e may correspond to neural network 105a in FIG. 1 and, in some embodiments, neural network 305n and 305e may be the same. For example, neural network 305e may be performed on existing image 335 at first point in time when existing image 335 is first submitted to computer system 100 as part of a new profile request. The generated vector representation 360e may be stored in a database in computer system 100 (or a storage device accessible by computer system 100) after being generated. This use of two neural networks (or two performances of a same neural network) to generate comparable vector representations may be referred to as a "Siamese network."

At a second point in time, new profile image 330 is submitted to new profile process 101 on computer system 100 as a part of a new profile request. Machine learning model 300 performs neural network 305n on new profile image 330 after the submission to generate vector representation 360n. Machine learning model 300 may retrieve stored vector representations of one or more existing images to compare to vector representation 360n, including vector representation 360e. Machine learning model 300 may then generate distance metric 365 based on vector representations 360n and 360e. A value of distance metric 365 provides an indication of the degree of similarity between new profile image 330 and existing image 335. Distance metric 365 may include a summation of differences between respective elements of vector representations 360n and 360e. For example, similar images may have fewer differences than dissimilar images, resulting in a lower value of distance metric 365.

To generate vector representation 360n, neural network 305n sends pixel data of new profile image 330 to a first of convolution layers (convolution) 352n. The output of the first convolution layer 352n may then be sent to a next one of convolution layers 352n. This process repeats until all convolution layers 352n have been performed. Each of convolution layers 352n may process a different characteristic of new profile image 330. For example, one of convolution layers 352n may place a higher weight on particular colors, and or be configured to identify particular types of shapes in the pixel data.

Outputs from some or all of convolutional layers 352n may then be sent to one or more pooling layers (pool) 354n. Pooling layers 354n may be configured to combine particular outputs of convolutional layers 352n to reduce a size of the output. For example, if new profile image 330 is 800 pixels wide by 600 pixels tall, then the image has a total of 480000 pixels. The output of each convolutional layer 352n may have a similar number of outputs. Pooling layers 354n may combine a portion of these outputs to reduce the number of outputs, for example to reduce a complexity of further analysis.

The outputs of pooling layers 354n are a plurality of nodes 356n. Each node 356n may correspond to a degree to which new profile image 330 exhibits a particular characteristic.

Nodes 356n may be combined in a variety of ways to generate vector representation 360n. Vector representation 360n provides a series of numeric values indicative of various characteristics of new profile image 330 and may, therefore, be used to compare two different images to determine a degree of similarity between the two images.

Neural network 305e may generate vector representation 360e in a similar manner as neural network 305n. Pixel data of existing image 335 is processed using convolution layers 352e to determine one or more different characteristics of existing image 335. The output of convolution layers 352e is sent to pooling layers 354e to reduce a size of the output. The resulting output is a plurality of nodes 356e, providing indications of degrees to which existing image 335 exhibits various characteristics. Vector representation 360e may then be generated using nodes 356e. Formats for vector representations 360n and 360e may be selected to enable an accurate comparison to determine whether new profile image 330 appears to be a deceptive version of existing image 335.

The training of the contrastive loss function may be used to modify how neural network 305n generates the vector representations. For example, weights used in one or more of convolutional layers 352n may be modified based on the training. In some embodiments, the training includes replacing, by computer system 100 in neural network 305n, values in a particular number of convolutional layers 352n with values learned during the training of contrastive loss function 110. In addition, the training may be used to weight various combinations of nodes 356n when generating vector representation 360n. As disclosed above, neural networks 305n and 305e may correspond to different performances of the same neural network.

It is noted that FIG. 3 is merely an example for demonstrating the disclosed concepts. A limited number of elements (e.g., convolution layers, pooling layers, etc.) for describing the concepts have been illustrated. In other embodiments, additional elements may be included, such as additional convolution and/or pooling layers.

Figure 4:
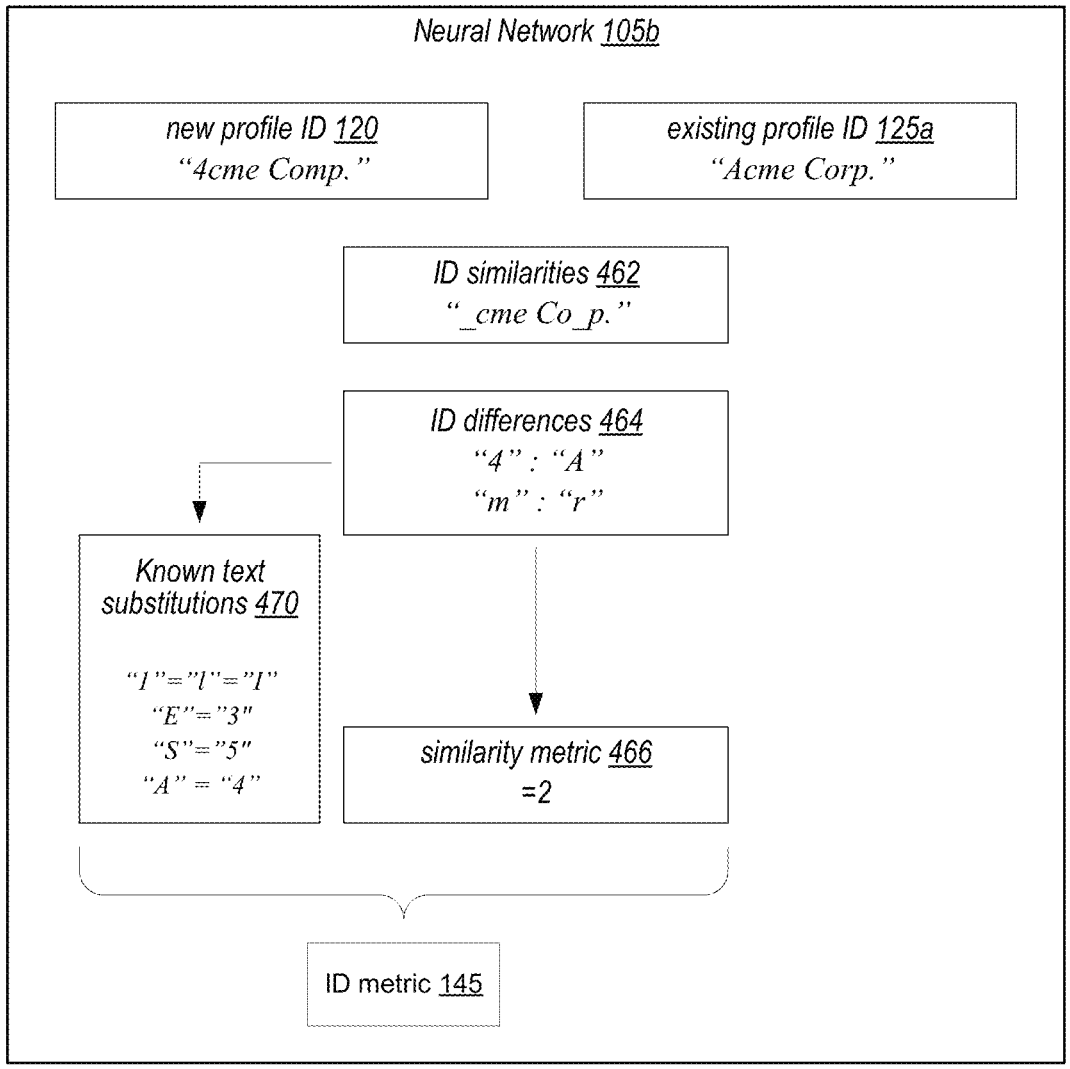
FIG. 4 illustrates a block diagram of an embodiment of a neural network performing a comparison between two profile identifiers.

FIGS. 2 and 3 describe techniques involved in comparing images. The new profile information, as disclosed, includes profile identifiers. In addition to comparing a new profile image to existing images, a new profile identifier may be compared to existing identifiers. In FIG. 4, an example of a technique for comparing identifiers is presented.

Proceeding to FIG. 4, an embodiment of a neural network that utilizes a similarity metric, such as Hamming distance, for comparing two strings is depicted. Neural network 105b performs an analysis of two strings to determine a degree of similarity between the two. In the example of FIG. 4, new profile identifier 120 is a first input string and existing profile identifier 125a is a second input string. Similarity metric 466 is determined based on identifier similarities 462 and identifier differences 464. In addition, known text substitutions 470 may be used to weight a resulting Similarity metric 466 to generate identifier metric 145.

As disclosed above, new profile process 101 performs a comparison to determine whether new profile identifier 120 satisfies a threshold identifier metric when compared to any existing profile identifiers 125. This comparing includes, using, by computer system 100, neural network 105b for detecting new profile identifier 120 similarities by analyzing a number of characters of new profile identifier 120 that are different from ones of existing profile identifiers 125. Satisfying the threshold identifier metric includes determining, by computer system 100 using neural network 105b, that new profile identifier 120 is different than the one or more existing profile identifiers 125, and further determining that new profile identifier 120 differs from of the existing profile identifier 125a by less than a threshold number of characters.

Similarity metric 466 is determined by comparing two strings of a same length and determining how many changes are needed to transform new profile identifier 120 to existing profile identifier 125. In the illustrated example, new profile identifier 120 is "4cme Comp." and existing profile identifier 125a is "Acme Corp." As shown by identifier similarities 462, all characters but two are the same. Identifier differences 464 indicates that the characters "4" and "m" are included in new profile identifier 120 in place of the characters "A" and "r" found in the same character positions of existing profile identifier 125a. This difference results in a Similarity metric 466 of 2.

Neural network 105b further analyzes identifier differences 464 to determine whether the characters that are different include known text substitutions 470. Text substitution may be utilized by a user to differentiate a profile identifier from an existing identifier while maintaining a similar look. For example, a user named "Steve Smith" may wish to use his name as a profile identifier, but learn that this profile identifier is already in use. One character substitution may include replacing a capital "S" with the number "5." Accordingly, Steve may attempt to establish his profile using the identifier "Steve Smith." Such a collection of known text substitutions 470 may be used to determine if new profile identifier 120 may be more similar to existing profile identifier 125a than Similarity metric 466 indicates. In the illustrated example, "m" and "r" are not considered a common text substitute, but the use of "4" in place of a capital "A" is a known substitute. Accordingly, identifier metric 145 may be assigned a value less than 2.

New profile process 101 may receive identifier metric 145 and make a determination whether new profile identifier 120 is part of an attempt to create a fraudulent profile to deceive users of Acme Corp.'s profile. For example, new profile process 101 may compare identifier metric 145 to one or more threshold values to determine if a threshold value is satisfied. If so, then new profile process may take a particular action, such as performing additional analysis, rejecting the new profile request, and/or flagging request for the attention of a system administrator.

It is noted that FIG. 4 is an example. In other embodiments, additional elements and/or a different set of elements may be included. For example, as shown, Hamming distance and text substitution are shown as two forms of analysis. In other embodiments, additional forms of analysis may be used, such as a vocabulary analysis that determines is words with similar meanings are substituted, e.g., "company" in place of "corporation." Furthermore, in addition to, or in place of, the Hamming distance, a value indicative of the percentage difference of characters between the new profile identifier and an existing profile identifier may be determined.

Figure 5:
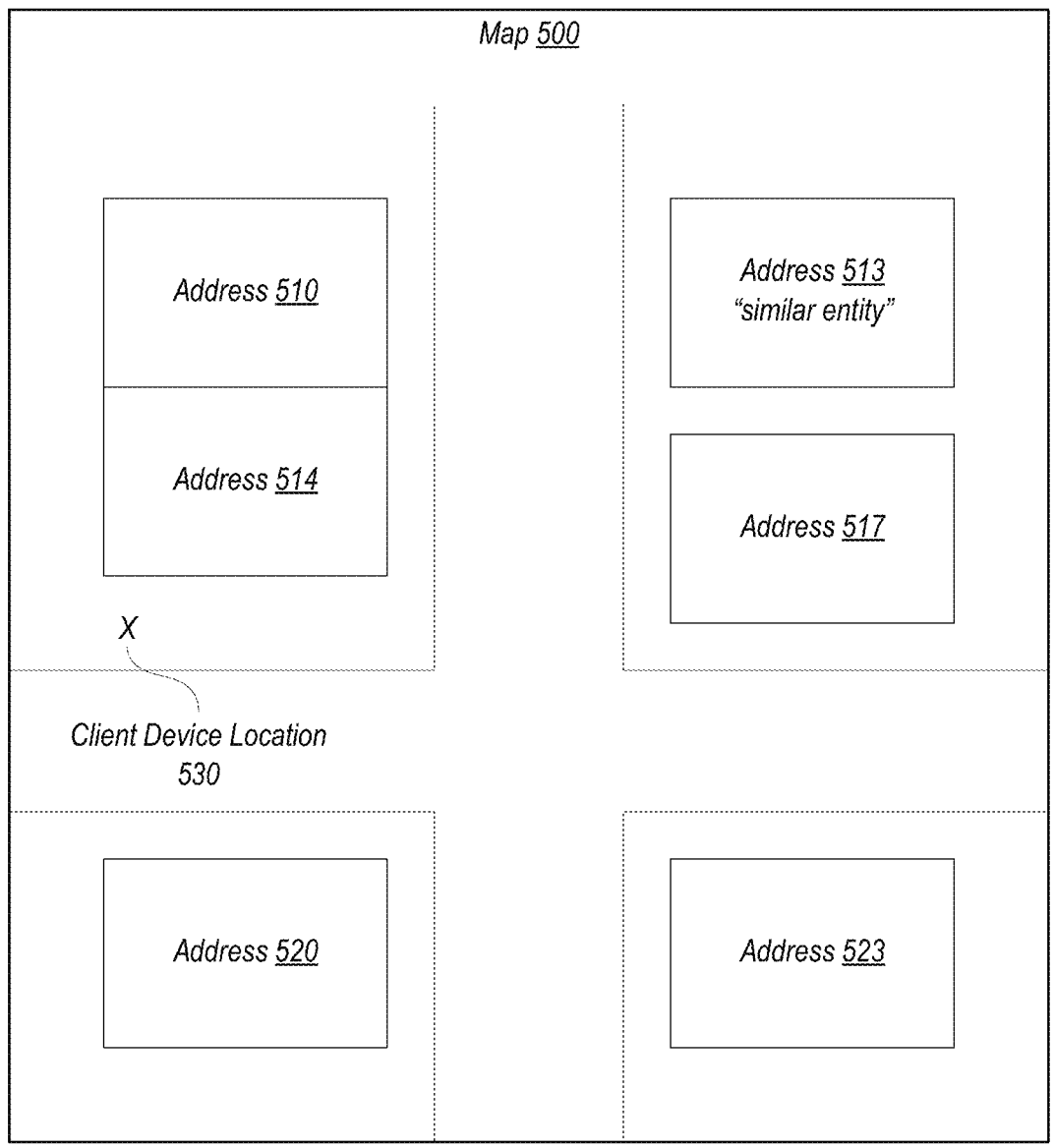
FIG. 5 shows a depiction of a map used to determine a location of a device requesting a new profile.

The techniques described in regards to FIGS. 1-4 use new profile information submitted by a user to determine if the new profile request is legitimate or a potential fraudulent profile. In some embodiments, additional information may be available to help make the determination. In FIG. 5, use of location data to further make a determination is depicted.

Moving now to FIG. 5, an example of using location data of a device associated with a new profile request in determining legitimacy of the request is shown. FIG. 5 depicts map 500, representative of a street map on to which is projected client device location 530. Client device location 530 indicates a geographic location of a mobile device used by a user submitting a new profile request. Addresses 510-523 are building addresses located in the vicinity of client device location 530.

As illustrated, new profile process 101 may use client device location 530 when making a determination whether a new profile request received from the client device is legitimate. After receiving the new profile request, new profile process 101 may use neural networks 105a and 105b to determine image metric 140 and identifier metric 145 as shown in FIG. 1. If these two metrics provide indications that the new request may be a fraudulent copy of a particular legitimate profile, then new profile process 101 may attempt to determine, if available, client device location 530. Client device location 530 may be determined using any suitable technique, such as requesting global positioning system (GPS) coordinates from the client device, and/or using network information corresponding to one or more networks to which the client device is currently connected.

Using client device location 530, new profile process 101 may be capable of determining if the client device is making the new profile request while in the vicinity of an address associated with the particular profile. For example, if address 513 is a location of a business associated with the particular profile, new profile process 101 may determine that client device location 530 is in the same vicinity. Using this information, new profile process 101 may increase the likelihood that the new profile request is potentially fraudulent.

The new profile requestor may be attempting to create a fraudulent profile before entering the place of business. In some embodiments, the business profile may be used by customers and/or employees to process payments, reserve appointments or products, provide indications of customer loyalty rewards, and the like. Using a fraudulent profile, a malicious entity may attempt to defraud the business using fake payments, rewards, reservations and such. Accordingly, new profile process 101 may flag new profiles created in the vicinity of locations associated with existing profiles as potentially deceptive.

FIGS. 1-5 describe systems and techniques for analyzing new profile requests and making determinations whether the requests are legitimate or potentially fraudulent. These techniques may be implemented using a variety of methods, FIGS. 5-8 depict three methods that may be utilized for analyzing new profile requests.

Figure 6:
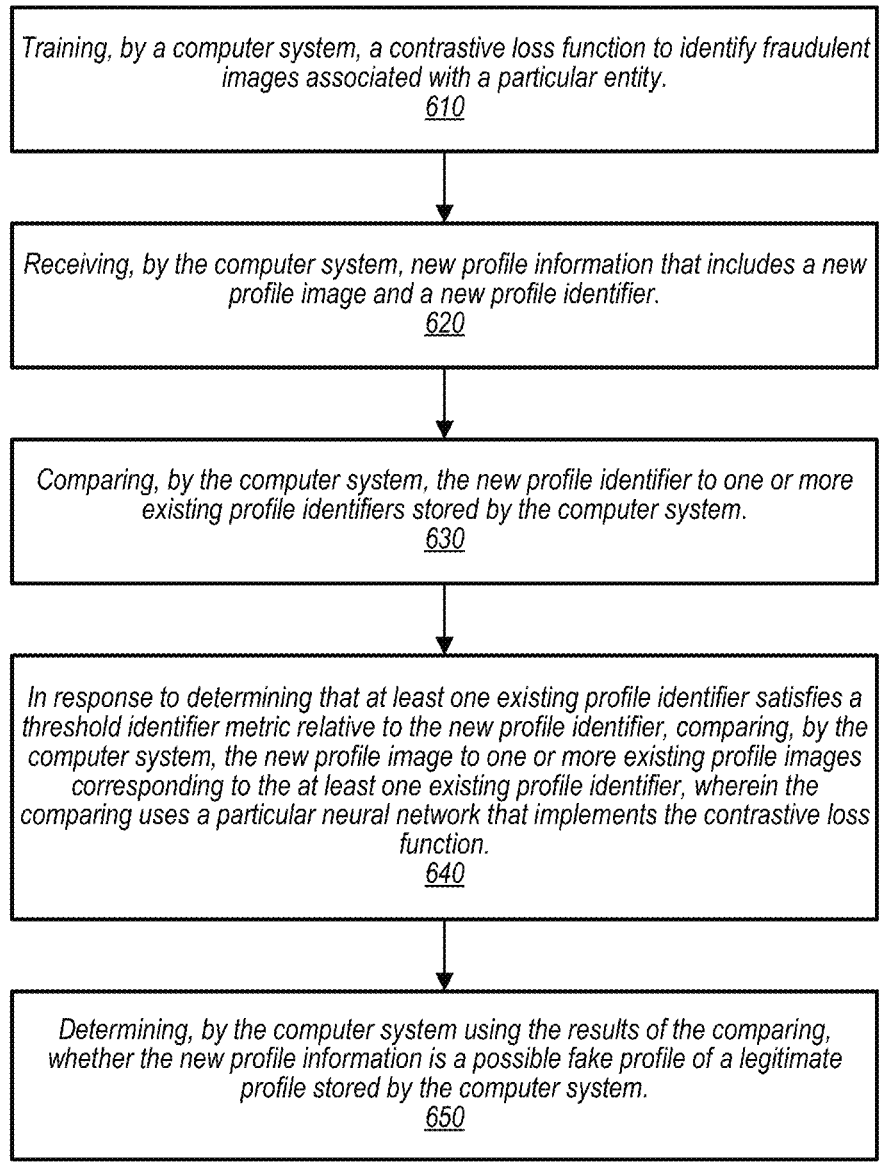
FIG. 6 illustrates a flow diagram of an embodiment of a method for operating a new profile process.

Proceeding now to FIG. 6, a flow diagram of an embodiment of a method for determining whether a new online profile is a possible fake is illustrated. In some embodiments, method 600 may be performed by computer system 100 in FIG. 1. Computer system 100 may, for example, include (or have access to) a non-transitory, computer-readable medium having program instructions stored thereon that are executable by the computer system to cause the operations described with reference to FIG. 6. Referring collectively to FIG. 1 and method 600, the method begins in block 610.

Method 600, in block 610, includes training, by computer system 100, contrastive loss function 110 to identify fraudulent images associated with a particular entity. Prior to receiving new profile requests, contrastive loss function 110 may be trained to identify fraudulent images associated with a particular entity. This training of contrastive loss function 110 may include comparing one or more images from an anchor entity to one or more negative images that appear similar to the anchor image, but are associated with a different entity than the anchor entity. The training further includes comparing the anchor images to one or more positive images that are associated with the anchor entity, but have a different appearance from the anchor images. Using a contrastive loss function for training may teach a machine learning model to recognize differences between images of different entities, and to recognize the characteristics of a common entity that remain consistent across a variety of different images.

At block 620, method 600 further includes receiving, by computer system 100, new profile information 115 that includes new profile image 130 and new profile identifier 120. As shown, a user desiring to create a new online profile may submit new profile information 115 as part of a new profile request. In various embodiments, new profile information 115 may be sent by the user with the initial request, or new profile process 101 may request the user provides new profile information 115 after the new profile request is received. Before approving the new profile request, new profile process 101 determines if there is an existing profile with profile information that matches new profile information 115.

Method 600 also includes, at block 630, comparing, by computer system 100, new profile identifier 120 to one or more existing profile identifiers 125 stored by computer system 100. As illustrated, new profile process 101 may use neural network 105b to perform the comparison of new profile identifier 120 to existing profile identifiers 125. For example, Similarity metric 466 of FIG. 4 may be determined between strings included in new profile identifier 120 and strings included in respective ones of existing profile identifiers 125. If there is an exact match (e.g., a Hamming distance of "0"), then no further analysis may be necessary and the new profile request may be rejected. In some embodiments, a notification may be sent to the user indicating that new profile identifier 120 is already in use, and request the user submit a different identifier. Otherwise, if there is not an exact match, then one or more of existing profile identifiers 125 that are close matches to new profile identifier 120 are identified. An identifier metric 145 may be determined for each of the identified existing profile identifiers 125, the identifier metrics indicating a respective degree of similarity between a given existing profile identifier 125 and new profile identifier 120.

Method 600, at block 640, also includes in response to determining that at least one existing profile identifier 125 satisfies a threshold identifier metric relative to new profile identifier 120, comparing, by computer system 100, new profile image 130 to one or more existing profile images 135 corresponding to the at least one existing profile identifier 125. If at least one of existing profile identifiers 125 is relatively similar to new profile identifier 120, without being an identical match, then computer system 100 compares new profile image 130 to one or more existing profile images 135 corresponding to the at least one of existing profile identifiers 125. The comparing may use neural network 105a that implements contrastive loss function 110, resulting in generation of image metric 140. Image metric 140 provides an indication of a degree of similarity between new profile image 130 and a corresponding one of existing profile images 135. If multiple existing profile identifiers 125 satisfy the threshold identifier metric, then neural network 105a may be run for all existing profile images 135 that correspond to any of the corresponding multiple existing profile identifiers 125.

At block 650, method 600 also includes determining, by computer system 100 using results of the comparing, whether new profile information 115 is a possible fake profile of a legitimate profile stored by computer system 100. As illustrated, in response to determining that new profile image 130 satisfies a threshold level of similarity to a particular existing profile image 135 (e.g., 135b) associated with a particular existing profile, new profile information 115 is identified as a possible fake profile of that particular existing profile. In response to identifying new profile information 115 as a possible fake profile of the particular existing profile, new profile process may select one of a set of actions based at least on a degree of similarity between new profile identifier 120 and existing profile identifier 125b, as well as a degree of similarity between new profile image 130 and particular existing profile image 135b.

By using the disclosed techniques, a user may be prevented from creating a fraudulent online profile, or a suspicious online profile may be tagged for further investigation by a system administrator or other agent of the provider of the online service. The disclosed techniques may provide a real-time analysis of new profile requests, such that fraudulent profiles that have a high degree of obviousness may be prevented from being approved, and more subtle fraudulent profiles that may have enough differences from existing profiles to be approved, may still be flagged for further review. An additional review may be able to prevent fraudulent activity from occurring or may at least reduce an amount of time during which such fraudulent activity may occur.

It is noted that the method of FIG. 6 includes elements 610-650. Method 600 may be repeated in response to receiving a subsequent new profile request, for example, returning to block 620. In some cases, method 600 may be performed concurrently with itself. For example, computer system 100 may include multiple processor cores, allowing two or more processor cores to perform method 600 independently from one another in response to receiving different new profile requests.

Figure 7:
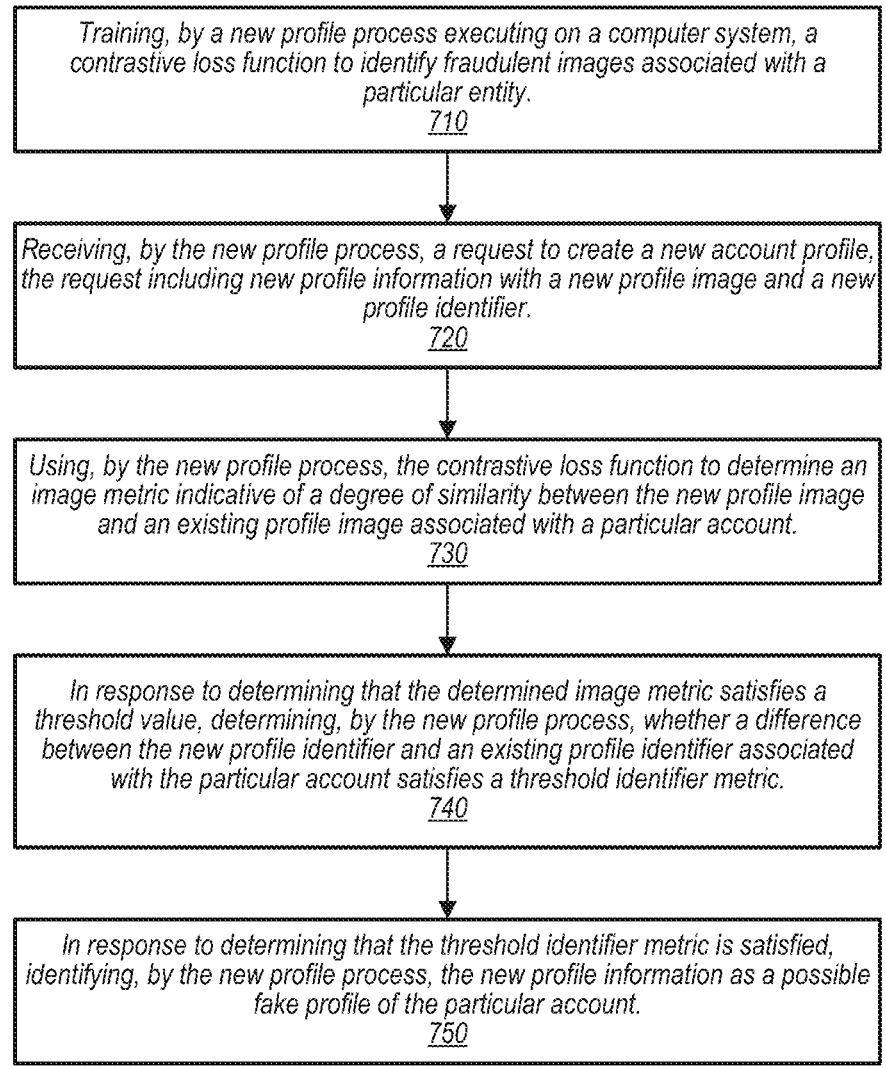
FIG. 7 depicts a flow diagram of another embodiment of a method for operating a new profile process.

Moving to FIG. 7, a flow diagram of another embodiment of a method for determining whether a new online profile is a possible fake is shown. In a similar manner as method 600, method 700 may, in some embodiments, be performed by computer system 100 in FIG. 1. Computer system 100 may, for example, include (or have access to) a non-transitory, computer-readable medium having program instructions stored thereon that are executable by computer system 100 to cause the operations described with reference to FIG. 7. Referring collectively to FIG. 1 and method 700 in FIG. 7, the method begins in block 710.

At block 710, method 700 includes training, by computer system 100, contrastive loss function 110 to identify fraudulent images associated with a particular entity. As described above, contrastive loss function 110 is trained to identify potentially fraudulent images associated with a given entity. Contrastive loss function 110 is trained to recognize differences between similar images from different entities and to recognize similarities between different images from a same entity.

Method 700 also includes, at block 720, receiving, by computer system 100, a request to create a new account profile, the request including new profile information 115 with new profile image 130 and a new profile identifier 120. When a user wants to setup a new profile in an online service, the user submits a request for a new profile. While most users may have legitimate intentions for use of this new profile, some users may have malicious intentions. For example, a malicious user may intend to defraud a business by deceiving employees of the business into believing that the fraudulent new profile is associated with the business when it is not. Accordingly, new profile process 101 is used to identify a new profile request that is potentially a fraudulent version of a legitimate profile.

Method 700, at block 730, further includes using, by computer system 100, contrastive loss function 110 to determine image metric 140 indicative of a degree of similarity between new profile image 130 and an existing profile image 135 associated with a particular account. As illustrated, computer system 100 has access to a database that includes existing profile images 135 associated with a variety of existing profiles. Neural network 105a, using the trained contrastive loss function 110, determines if new profile image 130 is suspiciously similar to any of these existing profile images 135. In some embodiments, vector representations (e.g., vector representation 360e of FIG. 3) of existing profile images 135 have been previously generated by neural network 105a, and stored in a database accessible to computer system 100. For example, the vector representations may be generated when each of existing profile images 135 was initially submitted as part of a respective profile request. Using previously generated vector representations may reduce a computational load of computer system 100 when performing the comparison of new profile image 130 to existing profile images 135, particularly if there are a high number of existing images (e.g., hundreds of thousands or millions). Neural network 105a generates a respective image metric 140 for each existing profile image 135 used in the comparison.

At block 740, method 700 also includes, in response to determining that the determined image metric 140 satisfies a threshold value, determining, by computer system 100, whether a difference between new profile identifier 120 and an existing profile identifier 125 associated with the particular account satisfies a threshold identifier metric. New profile process 101 may compare each generated image metric 140 to a threshold value. In various embodiments, satisfying the threshold value may correspond to being greater than or being less than the threshold value, depending on whether a value of image metric 140 is higher or lower when the two compared images are too similar. For example, image metric 140 may be a value between 0 and 1, where a value of 0 indicates no fraudulent similarities were found between two images and a value of 1 indicates a highest probability of fraudulent similarities, or vice versa. It is noted that the threshold value may be set by a system administrator based on a desired level of detection. If for example, false positive fraudulent determinations are more acceptable than false negative determinations, then the threshold value may be set to a value that is satisfied more easily. In contrast, if false positive fraudulent determinations are to be limited, then the threshold value may be set to a value that is more difficult to satisfy.

As shown, a corresponding existing profile identifier 125 is determined for each of the existing profile images 135 in which the image metric satisfies the threshold value. Neural network 105b may be performed for each of the set of corresponding existing profile identifiers 125 to compare each existing profile identifier 125 of the set to new profile identifier 120. Similar to neural network 105a, neural network 105b may generate a respective identifier metric 145 for each comparison, which may then be compared to a threshold identifier metric. In a similar manner as for the image metric threshold value, the threshold identifier metric may be set based on a desired level of possible fraud detection.

Method 700 further includes, at block 750, in response to determining that the threshold identifier metric is satisfied, identifying, by computer system 100, new profile information 115 as a possible fake profile of the particular account. As illustrated, if both an identifier metric 145 and an image metric 140 associated with a same existing profile satisfy their respective threshold values, then new profile information 115 is identified as a potential fraudulent imitation of this existing profile. In various embodiments, the fraudulent determination may result in the new profile request being rejected. In other embodiments, the new profile request may be approved, but the profile flagged for further review by, for example, a system administrator. In some embodiments, the action taken by computer system 100 may depend on the values of image metric 140 and identifier metric 145. For example, each of image metric 140 and identifier metric 145 may be compared to one or more different threshold values to estimate a probability that the new profile request is fraudulent. If both image metric 140 and identifier metric 145 provide strong indications that the new profile request is fraudulent, then the new profile request may be rejected. Otherwise, if the two metrics do not provide a strong indication, then the new profile may be approved and flagged.

It is noted that method 700 of FIG. 7 may repeat, for example, in response to receiving another new profile request. Method 700 may, in such cases, return to block 720 in response to receiving a new profile request. In a similar manner as method 600, method 700 may be performed concurrently with itself.

Figure 8:
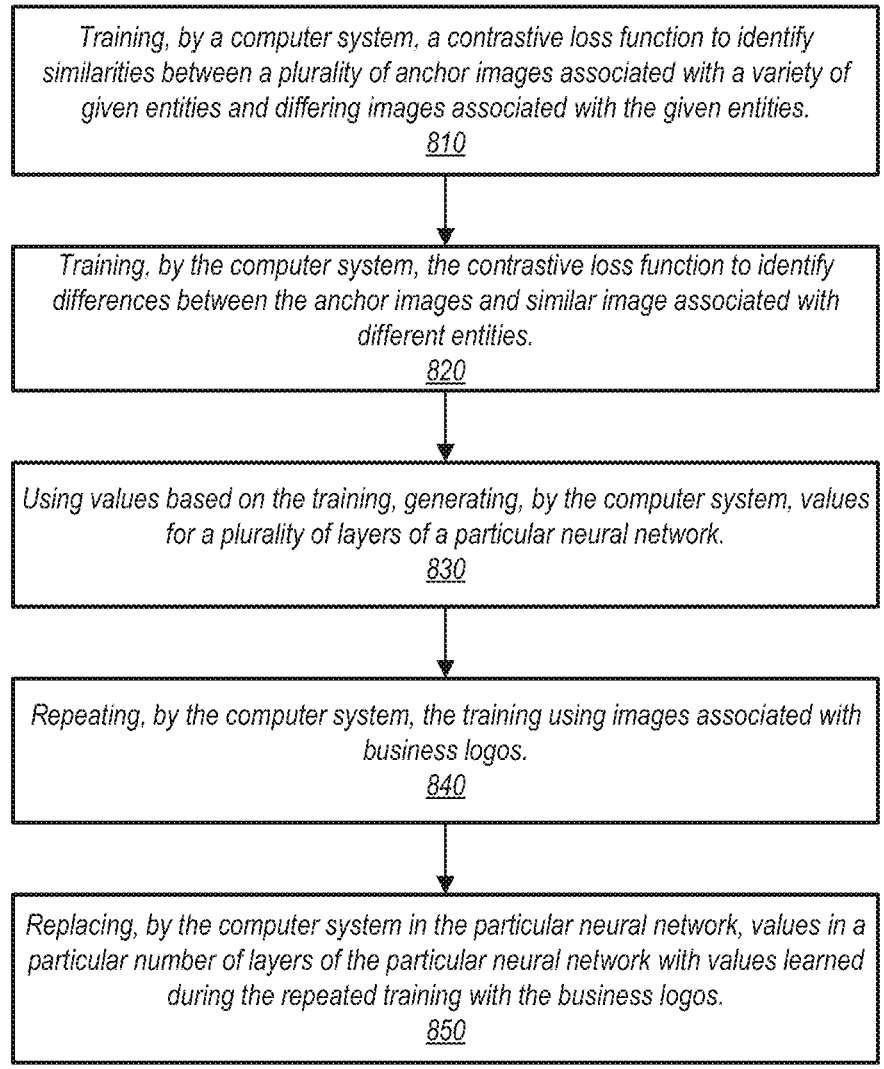
FIG. 8 illustrates a flow diagram of an embodiment of a method for training a contrastive loss function.

Turning to FIG. 8, a flow diagram of an embodiment of a method for training a neural network that utilizes a contrastive loss function to determine if a new profile image is a potential fake of an existing profile image is illustrated. In a similar manner as methods 600 and 700, method 800 may be performed by computer system 100 in FIG. 1. For example, computer system 100 may include (or have access to) a non-transitory, computer-readable medium having program instructions stored thereon that are executable by computer system 100 to cause the operations described with reference to FIG. 8. Referring collectively to FIGS. 2 and 8, method 800 begins in block 810.

Method 800 includes, at block 810, training, by computer system 100, contrastive loss function 110 to identify similarities between a plurality of anchor images associated with a variety of given entities and differing images associated with the given entities. As shown, computer system 100 utilizes a set of anchor images for training contrastive loss function 110, which may be a triplet loss function. In other embodiments, other types of functions may be utilized, such as large margin nearest neighbor, max margin contrastive loss, multi-class N-pair loss, supervised NT-Xent loss, and information theoretic metric learning (ITML) functions. Each anchor image is compared to one or more different positive images, with contrastive loss function 110 receiving positive feedback when similar characteristics of the two images are identified. If contrastive loss function 110 fails to identify one or more similar characteristics or identifies a different characteristic as being similar, then corrections are provided to increase a likelihood of similar characteristics being identified in future comparisons. A "positive" image, as used herein, refers to an image that is associated with a same entity as the anchor image. Differences between the anchor image and positive image may include color changes, different degrees of rotation of objects within the images, different numbers of common shapes, and the like. The purpose of this portion of training is to teach contrastive loss function 110 to recognize elements that correspond to the anchor image even when the positive image has a number of differences from the anchor image.

At block 820, method 800 further includes training, by computer system 100, contrastive loss function 110 to identify differences between the anchor images and similar image associated with different entities. As a complementary step in the training of contrastive loss function 110, computer system 100 may compare each of the anchor images to one or more similar negative images, with contrastive loss function 110 receiving positive feedback when differences between the two images are identified. If contrastive loss function 110 fails to identify one or more differences or incorrectly identifies a similar characteristic as a difference, then corrections are provided in a similar manner as described for block 810. A "negative" image, as used herein, refers to an image that is associated with a different entity then the anchor image.

Method 800, at block 830, also includes, using values based on the training, generating, by computer system 100, values for a plurality of layers of neural network 105a. As illustrated, when used by new profile process 101, neural network 105a is used to compare a new profile image to a plurality of existing profile images to determine if the new image is intended to be used as part of a fraudulent profile. In some embodiments, neural network 105a is a Siamese network, using a same set of weight values when used with two or more different image inputs. Neural network 105a may include a plurality of layers (e.g., convolution layers 352n and 352e in FIG. 3), each layer including a respective set of weight values. These weight values, as shown, are generated, at least in part, based on the training performed in blocks 810 and 820 using contrastive loss function 110.

Method 800 further includes, at block 840, repeating, by computer system 100, the training using images associated with business logos. The anchor, positive, and negative images used in blocks 810 and 820 may include any suitable images that can be associated with a given entity. The entities may include a variety of suitable subjects. For example, the images may include various human faces, types of animals, types of plants, various architectural elements, landmarks, art work, etc. For example, a given anchor image may be a particular image of particular person in a particular pose. Positive images may be images of the same person in a variety of different poses, wearing clothes, positioned in front of different backgrounds, and the like. Negative images may include various images of different individuals in similar poses, in similar clothes, and/or in front of similar backgrounds as the anchor image.

In block 840, training steps similar to blocks 810 and 820 are repeated using images of various business logos. An anchor image of a logo of a particular business is selected and positive images may include the same logo in different colors and/or rotated in relation to the anchor image. Positive images may further include different versions of the same logo, such as different generations of a logo that has been modified over time. The negative logos may include logos of different companies that share similar characteristics as the anchor logo, such as colors, shapes, text, fonts, and the like.

At block 850, method 800 further includes replacing, by computer system 100 in neural network 105a, values in a particular number of layers of neural network 105a with values learned during the repeated training with the business logos. As illustrated, one or more layers (e.g., convolution layers 352n) of neural network 105a are replaced using weight values determined during the training of block 840. Replacing one or more layers with values determined using business logos may enable neural network 105a to more accurately identify a potentially fraudulent image that is associated with a business entity. Business entities may be more likely targets of fraudulent profiles due to a greater potential to use the fraudulent profile for financial gain.

The method of FIG. 8, it is noted, includes elements 810-850. Method 800, or a portion thereof, may be repeated to improve an accuracy for correctly identifying fraudulent images. For example, results from use of neural network 105a may be reviewed at various points in time. If a reviewer determines that legitimate profile images are too frequently being flagged as potential frauds, or that fraudulent profiles are being allowed at an unacceptable rate, then neural network 105a and contrastive loss function 110 may retrained as an attempt to improve the accuracy. In such cases, improperly identified images may be used as part of additional training.

Although operations of method 800 are shown as occurring in a serial fashion, at least some portion of the operations may occur in a different or overlapping order. For example, operations 810 and 820 may be performed in a different order, including overlapping. It is further noted that any or all of methods 600-800 may be performed in an automated fashion without user input.

Figure 9:
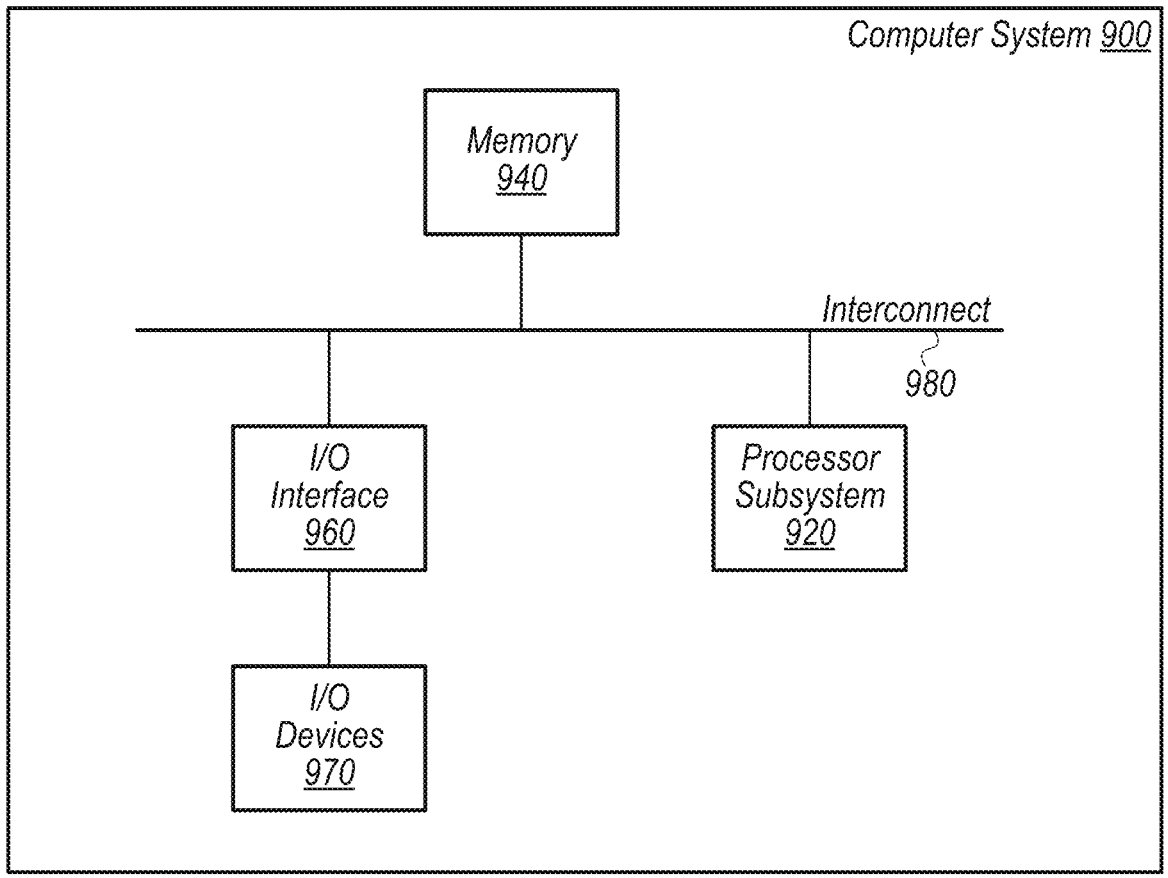
FIG. 9 is a block diagram illustrating an example computer system, according to some embodiments.

Referring now to FIG. 9, a block diagram of an example computer system 900 is depicted. Computer system 900 may, in various embodiments, implement disclosed computer systems, such as computer system 100 in FIG. 1 and/or client devices such as described in regards to FIG. 5. Computer system 900 includes a processor subsystem 920 that is coupled to a system memory 940 and I/O interfaces(s) 960 via an interconnect 980 (e.g., a system bus). I/O interface(s) 960 is coupled to one or more I/O devices 970. Computer system 900 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, etc. Although a single computer system 900 is shown in FIG. 9 for convenience, computer system 900 may also be implemented as two or more computer systems operating together.

Processor subsystem 920 may include one or more processors or processing units. In various embodiments of computer system 900, multiple instances of processor subsystem 920 may be coupled to interconnect 980. In various embodiments, processor subsystem 920 (or each processor unit within 920) may contain a cache or other form of on-board memory.

System memory 940 is usable to store program instructions executable by processor subsystem 920 to cause computer system 900 perform various operations described herein. System memory 940 may be implemented using different physical, non-transitory memory media, such as hard disk storage, floppy disk storage, removable disk storage, flash memory, random access memory (RAM-SRAM, EDO RAM, SDRAM, DDR SDRAM, LPDDR SDRAM, etc.), read-only memory (PROM, EEPROM, etc.), and so on. Memory in computer system 900 is not limited to primary storage such as system memory 940. Rather, computer system 900 may also include other forms of storage such as cache memory in processor subsystem 920 and secondary storage on I/O devices 970 (e.g., a hard drive, storage array, etc.). In some embodiments, these other forms of storage may also store program instructions executable by processor subsystem 920.

I/O interfaces 960 may be any of various types of interfaces configured to couple to and communicate with other devices, according to various embodiments. In one embodiment, I/O interface 960 is a bridge chip (e.g., Southbridge) from a front-side to one or more back-side buses. I/O interfaces 960 may be coupled to one or more I/O devices 970 via one or more corresponding buses or other interfaces. Examples of I/O devices 970 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 970 includes a network interface device (e.g., configured to communicate over WiFi, Bluetooth, Ethernet, etc.), and computer system 900 is coupled to a network via the network interface device.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
   training, by a computer system included as part of a web-based service, a contrastive loss function to compare a submitted image to a plurality of images stored in a database, the contrastive loss function to be used to identify fraudulent images associated with a particular entity;
   receiving, by the computer system via a network connection, a request to create a new account profile, the request including new profile information that includes a new profile image and a new profile identifier;
   comparing, by the computer system, the new profile identifier to one or more existing profile identifiers stored by the computer system;
   in response to determining that at least one existing profile identifier satisfies a threshold identifier metric relative to the new profile identifier, generating a vector representation of the new profile image, wherein generating the vector representation of the new profile image includes using the contrastive loss function for:
   extracting a plurality of characteristics from ones of a plurality of pixel data of the new profile image;

generating corresponding outputs representative of the plurality of characteristics; and reducing a number of the outputs by combining the outputs into one or more vectors indicative of the plurality of characteristics;

comparing, by the computer system, the new profile image to one or more existing profile images corresponding to the at least one existing profile identifier, wherein the comparing includes generating a fake metric value that is indicative of a degree of similarity of the vector representation of the new profile image to vector representations of at least one of the one or more existing profile images associated with a legitimate profile; and determining, by the computer system, whether to reject the request to create the new account profile based on the fake metric value.

2. The method of claim 1, wherein the training includes:

training, by the computer system, the contrastive loss function to identify similarities between two differing images associated with a common entity; and training, by the computer system, the contrastive loss function to identify differences between two similar images associated with different entities.

3. The method of claim 2, wherein the training further includes replacing, by the computer system in a particular neural network, values in a particular number of layers of the particular neural network with values learned during the training of the contrastive loss function, wherein the particular neural network is a Siamese network.

4. The method of claim 3, wherein the comparing of the new and existing profile identifiers includes, using, by the computer system, a different neural network for detecting new profile identifier similarities wherein the different neural network analyzes a number of characters of the new profile identifier that are different from the existing profile identifiers.

5. The method of claim 4, wherein satisfying the threshold identifier metric includes:

determining, by the computer system using the different neural network, that the new profile identifier is different than the one or more existing profile identifiers; and determining, by the computer system using the different neural network, that the new profile identifier differs from a particular one of the existing profile identifiers by less than a threshold number of characters.

6. The method of claim 5, wherein the determining that the new profile identifier differs from the particular profile identifier by less than the threshold number of characters, includes determining that characters that are different include known text substitutions.

7. The method of claim 1, wherein determining whether to reject the request includes basing, by the computer system, the determining on:

a degree of similarity between the new profile identifier and a particular one of the existing profile identifiers; and a degree of similarity between the new profile image and a particular one of the existing profile images.

8. The method of claim 1, further comprising, in response to determining that the new profile information is possibly a fake profile:

determining, by the computer system, a geographic location of a device that sent the new profile information; and determining, by the computer system, a distance between the determined geographic location and a location associated with the legitimate profile; and using, by the computer system, the determined distance in determining whether to reject the request to create the new account profile.

9. A method, comprising:

training, by a computer system included as part of a web-based service, a contrastive loss function to compare a submitted image to a plurality of images stored in a database, the contrastive loss function to be used to identify fraudulent images associated with a particular entity;

receiving, by the computer system via a network connection, a request to create a new account profile, the request including new profile information with a new profile image and a new profile identifier;

generating, by the computer system, a vector representation of the new profile image, wherein generating the vector representation of the new profile image includes using the contrastive loss function for:

sending a plurality of pixel data of the new profile image to one or more convolution layers;

generating corresponding outputs representative of characteristics of the plurality of pixel data; and reducing the corresponding outputs into one or more vectors indicative of the characteristics of the plurality of pixel data;

determining, by the computer system, an image metric indicative of a degree of similarity between the vector representation of the new profile image and a vector representation of an existing profile image associated with a particular account;

in response to determining that the determined image metric is not an exact match but satisfies a threshold value, determining, by the computer system, whether a difference between the new profile identifier and an existing profile identifier associated with the particular account satisfies a threshold identifier metric; and in response to determining that the threshold identifier metric is satisfied, determining, by the computer system, whether to reject the request to create the new account profile based on a degree of similarity of the new profile image to at least one of the one or more existing profile images.

10. The method of claim 9, wherein the training includes:

training, by the computer system, the contrastive loss function to identify similarities between a plurality of anchor images associated with a variety of given entities and differing images associated with the given entities; and training, by the computer system, the contrastive loss function to identify differences between the anchor images and similar images associated with different entities.

11. The method of claim 10, wherein the contrastive loss function is used in a neural network that includes a plurality of layers, and wherein values for a portion of the layers are determined during the training using images associated with business logos.

12. The method of claim 10, wherein identifying similarities and differences in the training includes removing rotational differences between two images being compared.

13. The method of claim 9, wherein determining whether the threshold identifier metric is satisfied includes analyzing, by the computer system, a percentage of characters of the new profile identifier that are different from the existing profile identifiers.

14. A non-transitory, computer-readable medium having instructions stored thereon that are executable by a computer system included as part of a web-based service to perform operations comprising:
  training a contrastive loss function to identify images from a first entity that are similar to one or more images, stored in a database, that are associated with a second entity;
  receiving, via a network connection, a request to create a new account profile, the request including new profile information that includes a new profile image and a new profile identifier;
  comparing the new profile identifier to one or more existing profile identifiers;
  in response to determining that the new profile identifier is not an exact match but satisfies a threshold level of similarity to a particular existing profile identifier associated with a particular account, generating a vector representation of the new profile image, wherein generating the vector representation of the new profile image includes using the contrastive loss function for:
    generating respective outputs representative of different characteristics of a plurality of pixel data of the new profile image; and
    reducing a number of the outputs by combining the outputs into one or more vectors that are indicative of the different characteristics;
  comparing the vector representation of the new profile image to vector representations of one or more existing profile images associated with the particular account;
  generating a fake metric value that is indicative of a degree of similarity of the new profile image to the one or more existing profile images; and
  in response to determining that the fake metric value satisfies a threshold level of similarity to a particular existing profile image associated with the particular account, rejecting the request to create the new account profile.

15. The non-transitory, computer-readable medium of claim 14, wherein the training includes:
  training the contrastive loss function to identify similarities between an anchor image corresponding to the first entity and a differing image associated with the first entity; and
  training the contrastive loss function to identify differences between the anchor image and a similar image associated with a different entity.

16. The non-transitory, computer-readable medium of claim 14, further comprising storing vector representations of existing profile images in a database.

17. The non-transitory, computer-readable medium of claim 14, wherein the comparing of the new and existing profile identifiers includes analyzing a number of characters of the new profile identifier that are different from the existing profile identifiers.

18. The non-transitory, computer-readable medium of claim 14, wherein determining that the new profile image satisfies the threshold level of similarity includes basing the determining on:
  a degree of similarity between the new profile identifier and the particular existing profile identifier; and
  a degree of similarity between the new profile image and the particular existing profile image.

19. The non-transitory, computer-readable medium of claim 14, wherein training the contrastive loss function includes:
  based on values generated during a first training with a first set of training images, generating values for a plurality of layers of a particular neural network; and
  replacing values in a particular number of layers of the particular neural network with values generated during a second training with a second set of training images.

20. The non-transitory, computer-readable medium of claim 18, further comprising, in response to determining that the degree of similarity to both the particular existing profile identifier and the particular existing profile image fails to satisfy a different threshold, approving the request for the new account profile and including an indication that the new account profile has similarities to the particular account.

* * * * *